(12) United States Patent
Shetty

(10) Patent No.: US 12,294,502 B2
(45) Date of Patent: May 6, 2025

(54) TIME-SENSITIVITY TASK IDENTIFICATION SERVICE ACCORDING TO PREDICTED CONNECTIVITY ISSUES

(71) Applicant: Omnissa, LLC, Mountain View, CA (US)

(72) Inventor: Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 18/376,009

(22) Filed: Oct. 3, 2023

(65) Prior Publication Data
US 2025/0030609 A1 Jan. 23, 2025

(30) Foreign Application Priority Data
Jul. 19, 2023 (IN) .............................. 202341048658

(51) Int. Cl.
*H04L 41/147* (2022.01)
*H04L 67/306* (2022.01)
(52) U.S. Cl.
CPC .......... *H04L 41/147* (2013.01); *H04L 67/306* (2013.01)

(58) Field of Classification Search
CPC .......... G06Q 10/1093; G06Q 10/1095; H04W 16/22; H04L 41/147; H04L 41/145; H04L 43/0811; H04L 67/75; H04L 67/306
See application file for complete search history.

(56) References Cited

U.S. PATENT DOCUMENTS

| | | | |
|---|---|---|---|
| 2022/0150722 A1* | 5/2022 | Khan | H04W 24/02 |
| 2023/0128527 A1* | 4/2023 | Teshome | H04L 67/306 |
| | | | 709/224 |
| 2024/0154829 A1* | 5/2024 | Isberg | G06N 5/01 |

* cited by examiner

*Primary Examiner* — William G Trost, IV
*Assistant Examiner* — Christopher P Cadorna
(74) *Attorney, Agent, or Firm* — Kim & Stewart LLP

(57) ABSTRACT

Disclosed are various examples identifying time-sensitive tasks being performed by a user of a client device that may be affected by a network connectivity issue associated with the client device and alerting the user interacting with the client device of the identified time-sensitive tasks. Network connectivity data associated one or more client devices can be used to identify patterns and context in network connectivity loss based at least in part on location, time, date, etc. Additionally, user context data associated with a user can be analyzed to predict whether the user will experience any connectivity issues and identify any tasks or action items being performed by the user interacting with the client device that may be considered time-sensitive. A user can be notified of a potential connectivity issue that may affect the ability for the user to complete a time-sensitive task.

20 Claims, 5 Drawing Sheets

TIME-SENSITIVITY TASK IDENTIFICATION SERVICE ACCORDING TO PREDICTED CONNECTIVITY ISSUES

RELATED APPLICATIONS

Benefit is claimed under 35 U.S.C. 119 (a)-(d) to Foreign application No. 202341048658 filed in India entitled "TIME-SENSITIVITY TASK IDENTIFICATION SERVICE ACCORDING TO PREDICTED CONNECTIVITY ISSUES", on Jul. 19, 2023, by VMware, Inc., which is herein incorporated in its entirety by reference for all purposes.

BACKGROUND

With the emergence of bring-your-own-device (BYOD) technology in the workplace, enterprises permit employees or other personnel to use their own devices for business purposes. This can include accessing enterprise data, such as email and corporate documents. In addition, enterprises can provide company-owned devices to employees that may be used for personal use and therefore can be used to connect over secured or unsecured networks. However, a company can require the employee to enroll the device with a management service capable of protecting enterprise data from theft, loss, and unauthorized access. Administrators can utilize the management service to oversee operation of the devices enrolled with or otherwise managed by the service.

In an enterprise, an enterprise ecosystem can provide a structure for information sharing and communications for enterprise employees. For example, information sharing and communications can be supported by the enterprise ecosystem through the form of email or text messaging. In addition, the enterprise ecosystem can be structured to provide employees access to enterprise files that may contain enterprise manuals, policies, and procedures. However, there are instances in which a user may experience network connectivity issues that result in a loss of network signals (e.g., cellular, WI-FI, Bluetooth, etc.) thereby affecting the ability of the user to complete a given task or action item while interacting with his or her device. For example, a user may be in midst of working on a task or action item that requires a network signal when the network signal drops or experiences performance issues. This can result in the user scrambling to find a network signal to complete the task requiring the network signal.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
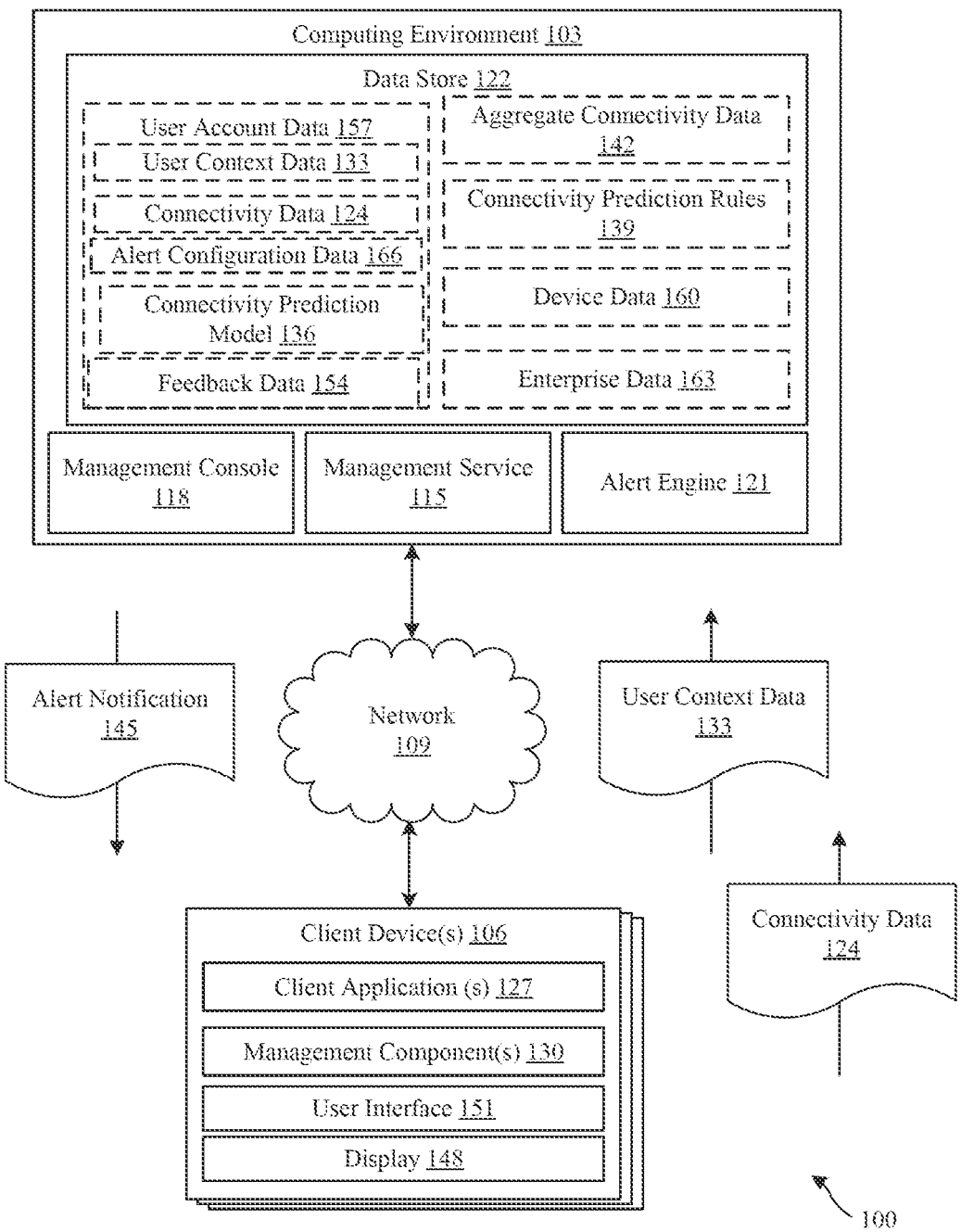
FIG. 1 is a drawing of a networked environment including a management service that communicates firmware profiles to managed devices.

The present disclosure relates to identifying time-sensitive tasks being performed by a user of a client device that may be affected by a network connectivity issue associated with the client device and alerting the user interacting with the client device of the identified time-sensitive tasks. In various examples, network connectivity data (e.g., loss of connectivity, date/time of connectivity loss, location of connectivity loss, duration of connectivity loss, user actions prior to connectivity loss, user appointments, etc.) associated one or more client devices can be used to identify patterns and context in network connectivity loss based at least in part on location (e.g., basement, underground parking lot, stairwell, elevator, building, park, etc.), time, date, etc. Additionally, user context data associated with a user can be analyzed to predict whether the user will experience any connectivity issues and identify any tasks or action items being performed by the user interacting with the client device that may be considered time-sensitive. In response to detecting or otherwise predicting a connectivity loss and identifying a time-sensitive task, a user can be notified of a potential connectivity issue that may affect the ability for the user to complete a time-sensitive task.

In an enterprise setting, for example, users may be interacting with client devices to complete work related tasks including replying to high priority emails, resolving high priority tickets, attending meetings, and/or other types of tasks. However, if the client device experiences a connectivity loss, the user may be unable to timely complete the task and/or may lose data associated with the task. Therefore, it can be beneficial to be able to alert the user of any future connectivity issues that may interrupt or otherwise affect the completion of a time-sensitive task.

According to various examples, (1) using knowledge and/or prediction of an upcoming connectivity issue with a client device and its duration and (2) identifying time-sensitive action items or tasks, an alert engine of the present disclosure can alert a user of the time-sensitive action items or tasks that may need to be completed before the occurrence of the connectivity issue. A connectivity issue can correspond to a loss or otherwise interruption of a network signal by a client device. The network signal can include a cellular signal, a WI-FI signal, Bluetooth signal, and/or other type of network signal that allows for the transfer of data between two entities. According to various examples, the alert engine of the present disclosure can collect connectivity data (e.g., loss of connectivity, date/time of connectivity loss, location of connectivity loss, duration of connectivity loss, user actions prior to connectivity loss, user appointments, etc.) from various sources associated with a client device to predict connectivity issues and/or better understand a context associated with the connectivity issue.

For example, a client application executed by a client device associated with a user can register for platform callbacks when the client device is out of a service area for one or more types of connectivity. As such, the client application can obtain information on whether a client device is connected to a network and can log the time, location, and/or duration associated with a connectivity drop. In addition, the alert engine can obtain connectivity data associated with connectivity losses from third-party service integrations. For example, client-side management services that a user may interact with to log on or off for the day can be used in determining patterns associated with a user's day and primarily, when the user may encounter a connectivity day.

In some examples, calendar data, messaging data, and/or third-party integration data associated with a user or client device of the user can be analyzed to deduce any upcoming appointments relative to a user's current location and any travel that may result in a connectivity delay (e.g., flight). For example, a user may have a meeting scheduled at a location (e.g., workplace) and they are currently their home. Based on patterns observed by the alert engine, the alert engine can predict connectivity issues during the travel of the user from home to the workplace as well as connectivity issues experiences in the home or workplace (e.g., basement, elevator, etc.). In another example, the calendar data can indicate an upcoming flight that is expected to last a given time period (e.g., 3 hours.). This information can be used to predict a connectivity issue for the time period associated with the schedule flight.

The connectivity data that is obtained by the alert engine can be analyzed to (1) determine patterns in connectivity issues at various locations and times and (2) understand the context associated with a connectivity issue being experienced. For example, if a connectivity issue is experienced by a client device of a user at a same time every day, the alert engine can determine whether the connectivity issues occurs when wen the user of the client device has logged off of work for the day and/or if he is exiting a building associated with his or her workplace. In various examples, the location of the user with respect to the connectivity issue can be an important parameter as it can be used to help understand the exact location where a connectivity issue occurs for various types of networks. This can be used for future connectivity issue predictions associated with the user and/or other users. In particular, the connectivity data collected for a given user can be used in an aggregate to help predict connectivity issues with other users.

In addition to determining and/or predicting connectivity issues, the alert engine can recognize time-sensitive action items or tasks that may be affected by a connectivity issue. In a workplace/enterprise situation, a time-sensitive action item or task can include replying to a high priority email, resolving a high priority ticket item, attending a meeting, and/or other types of tasks that may be associated with deadlines. It should be noted that a time-sensitive action item and/or task is not limited to tasks in a workplace/enterprise situation and can correspond to any type of action item or task that may require completion within a predefined period of time. In various examples, the time-sensitive tasks can be identified from an analysis of data that is obtained from user messaging data (e.g., email), user calendar information including upcoming appointments or meetings, integration with third-party systems (e.g., Jira, Salesforce, social media systems, etc.), and/or other types of services that are associated with a user.

With reference to FIG. 1, shown is an example of a networked environment 100. The networked environment 100 can include a computing environment 103 and one or more client devices 106 (also called client device 106) in communication with one other over a network 109. The network 109 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer, or any other system providing computing capability. Alternatively, the computing environment 103 can include a plurality of computing devices that are arranged, for example, in one or more server banks, computer banks, or other arrangements. The computing environment 103 can include a grid computing resource or any other distributed computing arrangement. The computing devices can be located in a single installation or can be distributed among many different geographical locations.

The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 109, the computing environment 103 can be described as a remote computing environment 103.

Various applications can be executed in the computing environment 103. For example, a management service 115, a management console 118, an alert engine 121, as well as other applications, may be executed in the computing environment. Also, various data is stored in a data store 122 that is accessible to the computing environment 103. The data store 122 may be representative of a plurality of data stores 122, which can include relational databases, object-oriented databases, hierarchical databases, hash tables or similar key-value data stores, as well as other data storage applications or data structures. The data stored in the data store 122 is associated with the operation of the various applications or functional entities described below.

The management service 115 can be executed to oversee the operation of client devices 106 enrolled with the management service 115. In some examples, an enterprise, such as a company, organization, or other entity, can operate the management service 115 to oversee or manage the operation of the client devices 106 of its employees, contractors, customers, or other users having accounts with the enterprise. An enterprise can include any customer of the management service 115.

The management console 118 can provide an administrative interface for configuring the operation of the management service 115 and the configuration of client devices 106 that are administered by the management service 115. Accordingly, the management console 118 can correspond to a web page or web application provided by a web server hosted in the computing environment 103. For example, the management console 118 can provide an interface for an administrative user to create configuration profiles to be applied to individual client devices 106, identify application updates that may be required on individual client devices 106, define recommended applications or updates for individual client devices 106, identify security requirements for individual client devices 106, recommend training that is available for users associated with individual client devices 106, as well as various other actions related to the operation of various implementations.

The alert engine 121 can be executed to collect connectivity data 112 from a client device 106 and analyze the connectivity data 112 to learn connectivity patterns associated with the client device 106. In various examples, the connectivity data 112 can include data associated with a loss of connectivity, date/time of connectivity loss, location of connectivity loss, a duration of connectivity loss, user actions prior to connectivity loss, user appointments, etc. The connectivity data 112 can be obtained from various sources associated with a client device such as, for example, a client application 127, a management component 130, and/or other services. In various examples, the client application 127 can correspond to third-party integration service, a messaging service, a calendar service, a management service, and/or other type of application that can collect information associated with connectivity and context associated with the connectivity of the client device.

In various examples, the alert engine 121 can be executed to obtain user context data 133 obtained from a client device associated with a user. The user context data 133 can include, for example, calendar data, messaging data, third-party integration data, and/or other information that can be used to better understand the user and the behavior of the interacting with the client device 106. In various examples, the alert engine 121 can analyze the user context data 133 and the connectivity data 124 to (1) determine and/or predict future connectivity issues for a given client device 106 and (2) identify any time-sensitive tasks or action items being performed or needing to be performed by the user that may be affected by the future connectivity issues.

In some examples, the alert engine 121 can train a learning model to predict connectivity issues and identify time-sensitive tasks. For example, during an observation period, the alert engine 121 can train a connectivity prediction model 136 that is specific to the user using the obtained connectivity data 124, the user context data 133, user-defined preferences, connectivity prediction rules 139, aggregate connectivity data 142, and/or other data. Once the connectivity prediction model 136 performs at a predefined level of certainty and/or the observation period has elapsed following a predefined period of time, the alert engine 121 can execute the connective prediction model 136 to predict connectivity issues and identify time-sensitive tasks.

In various examples, upon identifying a time-sensitive task, the alert engine 121 can generate an alert notification 145 identifying the time-sensitive task and the future connectivity issue and cause the alert notification 145 to be rendered on a display 148 of the client device 106. In some examples, the alert notification 145 can be rendered as a user interface component (e.g., pop-up box) presented on a user interface 151 associated with a client application 127 and/or management component 130 executing on the client device 106. In other examples, the alert notification 145 can comprise comprises a short messaging service (SMS) message. In other examples, the alert notification 145 comprises an email, a short messaging service (SMS) message, a push notification, a user interface component presented on a user interface 151 that a user may be interacting with at the notification time and/or any other type of notification. In some examples, the alert notification 145 can include a link that, upon selection, redirects the user to a user interface 151 for viewing the contents of the notification 145.

In various examples, the alert engine 121 can receive feedback data 154 provided by the user via interactions with the alert notification 145. The feedback data 154 can include user preferences associated with the time-sensitive task and/or connectivity issues included in the alert notification 145. For example, the feedback data 154 can adjust a priority associated with a given task which may make a task less likely or more likely to be considered a time-sensitive task. In addition, the feedback data 154 can include a time period associated with the connectivity issue. For example, a user may only wish to receive alert notifications 145 if a duration of a connectivity issue is greater than or equal to ten minutes. In various examples, the alert engine 121 can use the feedback data 154 to update the connectivity prediction model 136.

Although the management service 115 and the alert engine 121 are illustrated as being separate applications, it should be noted that some or all the functionality of the alert engine 121 can be included in the functionality of the management service 115. Likewise, some or all of the functionality of the management service 115 can be included in the functionality of the alert engine 121.

The data stored in the data store 122 can include, for example, user account data 157, aggregate connectivity data 142, connectivity prediction rules 139, device data 160, enterprise data 163, as well as potentially other data. The user account data 157 can include information pertaining to end users of the client devices 106 enrolled with the management service 115. For instance, the user account data 157 can include data used to authenticate an end user, such as a username, password, email address, biometric data, device identifier, registry identifier, or other data. Additionally, the user account data 157 can include other information associated with an end user, such as name, organization unit, or other information. In various implementations, the user account data 157 can include user context data 133, connectivity data 124, alert configuration data 166, a connectivity prediction model 136, feedback data 154, and/or other data.

The user context data 133 can include, for example, calendar data, messaging data, third-party integration data, a user device location, a user job profile, a user organization group, a user organization title, one or more upcoming travel engagements, a travel history, a calendar profile, a time (e.g., date, year, week, day), a seasonality, one or more user interests, and/or other data that can be used to better understand the user and the behavior of the interacting with the client device 106. The connectivity data 124 can comprise information associated with a loss of connectivity, a date/time of connectivity loss, a location of connectivity loss, a duration of connectivity loss, user actions prior to the connectivity loss, user appointments associated with the connectivity loss, and/or other data. The connectivity data 124 can be collected from various sources associated with a client device to predict connectivity issues and/or better understand a context associated with the connectivity issue.

The alert configuration data 166 corresponds to configuration data that defines how and when a user is to be notified of a potential connectivity issues and/or time-sensitive task. For example, a user can define user preferences associated with given tasks and/or connectivity time periods. In some examples, the alert configuration data 166 can be used to assign priority levels and/or priority weights to different types of tasks. The priority levels and/or weights can be used to determine whether a given task is to be considered a time-sensitive task if the occurrence of the task may be affected by a connectivity issue. In addition, the alert configuration data 166 can defines time durations of connectivity issues in which the user prefers to be notified. For example, a user may only want to be notified of a time-sensitive task if the duration of the connectivity issue meets or exceeds a predefined period of time (e.g., 10 mins). In some examples, a duration of the connectivity issue may be dependent on a given type of task which can be defined in the alert configuration data 166.

The connectivity prediction model 136 is specific to each user and can include, for example, a reinforcement learning algorithm, a logistic regression classifier, a random forest classifier, a decision tree classifier, a XGBoost classifier, a multi-layer perceptron classifier, a recurrent neural network, a feed-forward neural network, a label-specific attention network, and/or any other type of trained model as can be appreciated. In various implementations, the recommendation model 136 can be trained to predict a future connectivity issues and identify a time-sensitive task based at least in part on an analysis of user context data 133 and connectivity data 124.

The feedback data 154 can include user preferences associated with the time-sensitive task and/or connectivity issues included in the alert notification 145. For example, the feedback data 154 can adjust a priority associated with a given task which may make a task less likely or more likely to be considered a time-sensitive task. In addition, the feedback data 154 can include a time period associated with the connectivity issue. For example, a user may only wish to receive alert notifications 145 if a duration of a connectivity issue is greater than or equal to ten minutes or some other defined time period. In various examples, the alert engine 121 can use the feedback data 154 to update the connectivity prediction model 136.

The aggregate connectivity data 142 can include connectivity data 124 obtained from a plurality of client devices 106. Accordingly, the aggregate connectivity data 142 can include information obtained from multiple client devices 105 identifying different losses of connectivity, a date/time of the connectivity losses, locations of connectivity losses, durations of connectivity losses, user actions prior to the connectivity losses, and/or other data. The connectivity data 124 can be collected from various sources associated with multiple client device 106 to predict connectivity issues. The connectivity prediction rules 139 include rules, models, and/or configuration data for the various algorithms or approaches employed by the alert engine 121 in generating and training the connectivity prediction model 136 for a given user.

The device data 160 can include information about the client device 106. The device data 160 can include, for example, information specifying applications that are installed on the client device 106, configurations or settings that are applied to the client device 106, user accounts associated with the device 106, the physical location of the client device 106, the enterprise associated with the client device 106, the network to which the client device 106 is connected, the device group(s) to which the client device 106 belongs, and/or other information associated with the client device 106. Enterprise data 163 can include email, corporate documents, social media, messages, enterprise applications, confidential documents, and other enterprise content or communications.

The client device 106 is representative of one or more client devices that may be connected to the network 109. Examples of client devices 106 include processor-based systems, such as desktop computers, a laptop computers, a personal digital assistant, a cellular telephone, a smartphone, a tablet computer system, smart speakers or similar headless devices, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system which can be configured to execute various client applications 127, such as the management components 130, as well as other applications. In particular, the operating system can include a system software that facilitates operation of the client device 106, and execution of additional client applications. The main operating system can include an APPLE® iOS operating system, a MICROSOFT® Windows operating system, an APPLE® macOS operating system, a Linux operating system, a GOOGLE® Android operating system, or other operating systems.

Some client applications 127 can access enterprise data 163 and other network content served up by the computing environment 103 or other servers, thereby rendering a user interface 151 on a display 148, such as a liquid crystal display (LCD), touch-screen display, or other type of display device. To this end, some client applications 127, including the management component 130, can include a browser or a dedicated application, and a user interface 151 can include a network page, an application screen, or other interface. In some examples, a network page can include a web page having source code defined in hypertext markup language (HTML), cascading style sheets (CSS), Javascript, jQuery, or other applicable client-side web-based scripting language. Further, other client applications 127 can include device management applications, enterprise applications, social networking applications, word processors, spreadsheet applications, media viewing applications, instant messaging applications, or other applications.

In various examples, the client application 127, including the management component 130, can interact with the management service 115 or alert engine 121 to provide connectivity data 124 and user context data 133 and to receive alert notifications 145. In various examples, the client application 127 can generate a user interface 151 comprising the alert notification 145. In some examples, the user interface 151 comprises user interface components that upon selection cause the alert notification 145 to be rendered on the client device 106.

The management component 130 can be executed by the client device 106 to maintain data communication with the management service 115 in order to perform various actions on the client device 106 in response to instructions received from the management service 115. In some instances, the management component 130 includes a separate application executing on the client device 106. In other instances, the management component 130 includes a device management framework provided by or included in the operating system installed on the client device 106. The management component 130 can be configured to contact the management service 115 at periodic intervals and request that the management service 115 send any commands or instructions stored in a command queue to the management component 130. The management component 130 can then cause the client device 106 to perform the commands (e.g., provide status request, wipe client device 106, etc.) provided by the management service 115 or cause the client device 106 to modify the configuration settings installed on the client device 106 in accordance with any updated or received configuration profiles received from the management service 115.

In various examples, the client application 127 including the management component 130 can register with the operating system for platform callbacks when the client device 106 is out of a service area for any type of network connectivity, thereby resulting in a connectivity issue. Upon receiving a notification of a connectivity issue, the client application 127 can log the connectivity loss, the type of network associated with the connectivity loss, the date/time of the connectivity loss, a duration of the connectivity loss, and/or other information. In various examples, the log corresponds to the connectivity data 124 and can be provided to the management service 115 and/or alert engine 121. In some examples, the connectivity data 124 is provided at periodic intervals. In other examples, the connectivity data 124 is provided upon creation.

Figure 2:
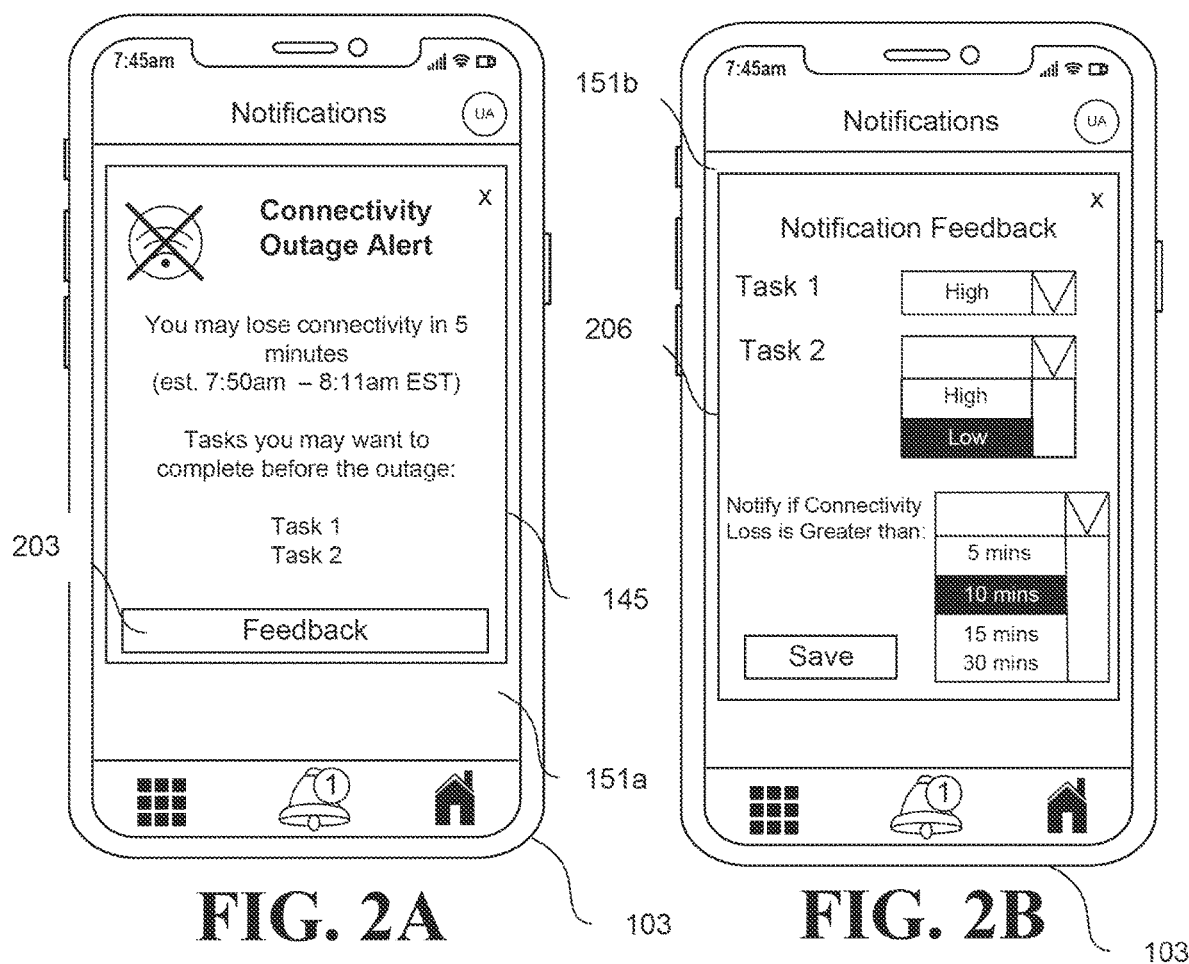
FIGS. 2A-2B are drawings of example user interfaces of a client application of the networked environment.

Moving on to FIGS. 2A and 2B, shown are examples user interfaces 151 (e.g., 151a, 151b) that can be rendered on a client device 106 via a client application 127, including the management component 130. To begin, FIG. 2A illustrates an example user interface 151 that can be rendered by the client application 127 (or management components 130) and corresponds to an example notification user interface 151 that can be rendered to include an alert notification 145. The alert notification 145 can identify one or more time-sensitive tasks that may be affected by a connectivity issue. In various examples, the alert notification 145 can be rendered on a display 148 of the client device 106. In some examples, as shown in FIG. 2B, the alert notification 145 can be rendered as a user interface component (e.g., pop-up box) presented on a user interface 151 associated with a client application 127 and/or management component 130 executing on the client device 106. In other examples, the alert notification 145 can comprise comprises a short messaging service (SMS) message. In other examples, the alert notification 145 comprises an email, a short messaging service (SMS) message, a push notification, a user interface component presented on a user interface 151 that a user may be interacting with at the notification time and/or any other type of notification. In some examples, the alert notification 145 can include a link that, upon selection, redirects the user to a user interface 151 for viewing the contents of the notification 145.

In the example of FIG. 2A, the alert notification 145 indicates a time period associated with a predicted connectivity issue (e.g., occurring in 5 minutes with a duration of 21 minutes) and lists time-sensitive tasks that may be affected by the predicted connectivity issue. In some examples, the alert notification 145 can include a feedback component 203 that upon selection can redirect the user to a feedback interface 206.

FIG. 2B corresponds to an example feedback interface 206 included on a user interface 151b rendered on the client device. The feedback interface 206 can allow the user to modify and/or otherwise generate feedback data 154 which can be used to modify alert configuration data 166. The alert configuration data 166 corresponds to configuration data that defines how and when a user is to be notified of a potential connectivity issues and/or time-sensitive task. For example, a user can define user preferences associated with given tasks and/or connectivity time periods. In the example of FIG. 2B, the user can modify the priority levels associated with a given task which the alert engine 121 can use to help tune future predications of time-sensitive tasks. For example, the alert engine 121 can update the connectivity prediction model 136 based at least in part on the feedback data 154 and/or alert configuration data 166 to align with the user preferences. In addition, the feedback data 154 can define time durations of connectivity issues in which the user prefers to be notified. For example, a user may only want to be notified of a time-sensitive task if the duration of the connectivity issue meets or exceeds a predefined period of time (e.g., 10 mins). In the example of FIG. 2B, the user can interact with various interface components in the feedback interface 206 to select a preferred connectivity issue duration for when a user is to be notified. Although the components illustrated in FIG. 2B, correspond to drop-down boxes, it should be noted that the user interface components are not limited to drop-down boxes and can include other types of user interface components including, for example, text entry boxes, radio buttons, check boxes, and/or other types of components.

Figure 3:
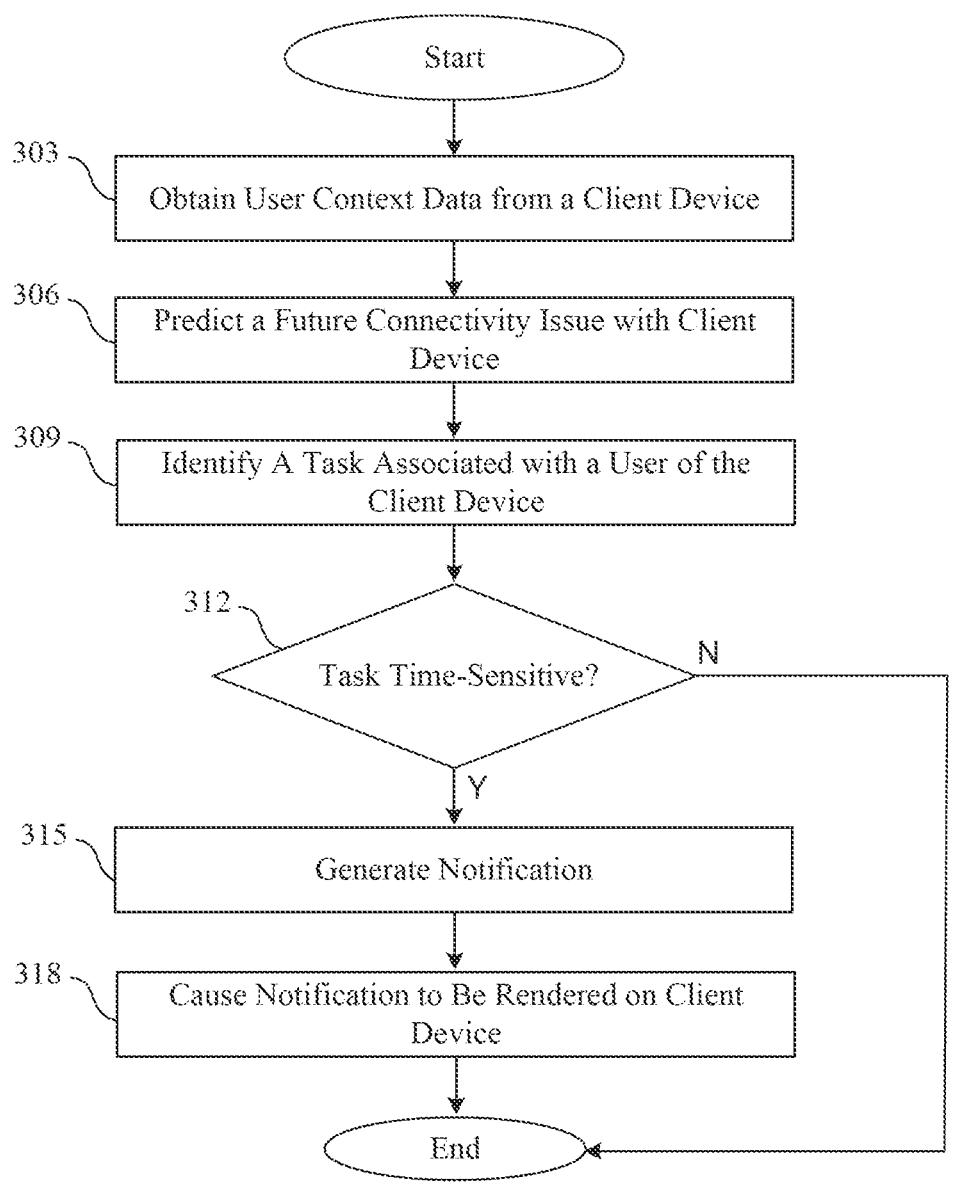
FIGS. 3-6 are flowcharts depicting the example operations of a component of the computing environment or client device of the network environment of FIG. 1.

Moving on to FIG. 3, shown is a flowchart 300 that provides one example of the operation of a portion of the alert engine 121. The flowchart of FIG. 3 can be viewed as depicting an example of elements of a method implemented by the alert engine 121 executing in the computing environment 103 according to one or more examples. The separation or segmentation of functionality as discussed herein is presented for illustrative purposes only.

Beginning at step 303, the alert engine 121 receives user context data 133 from a client device 106. The user context data 133 can include, for example, calendar data, messaging data, third-party integration data, and/or other information that can be used to better understand the user and the behavior of the interacting with the client device 106. In various examples, the user context data 133 can be collected by the client application 127 (or management component 130) executed on the client device 106 an provided to the alert engine 121. In some examples, the user context data 133 is received intermittently, periodically, at a predefined schedule, and/or other period of time.

At step 306, the alert engine 121 predicts a future connectivity issue with the client device 106 based at least in part on an analysis of the user context data 133. In various examples, the user context data 133 can be analyzed to identify location areas, times in location areas, and/or other information that can be used to determine if the patterns included in the user context data 133 match or otherwise align with patterns of connectivity issues determined by the alert engine 121 in response to an analysis of connectivity data 124 received from the client device 106 associated with the user and/or client devices 106 associated with multiple users. For example, the user context data 133 can include calendar data detailing a flight associated with the user of the client device 106. In this example, the alert engine 121 can predict a connectivity issue during the duration of the flight. In another example, the user context data 133 may be analyzed to determine that the user of the client device 106 is traveling to his or her workplace and based on prior connectivity data 124 and behaviors of the user associated with the client device 106, the alert engine 121 can determine that the user will experience a connectivity issue at predicted times during the travel to his or her workplace (e.g., elevator, parking garage, tunnel, etc.).

In some examples, the alert engine 121 can execute a connectivity prediction model 136 which can be trained to predict connectivity issues based at least in part on the user context data 133. For example, the connectivity prediction model 136 can be trained using historical connectivity data 124 associated with one or more client devices 106 associated with one or more users. In this example, the connectivity prediction model 126 can apply learned patterns of connectivity issues along with the user context data 133 to detect future connectivity issues.

At step 309, the alert engine 121 identifies a task associated with the user of the client device 106. In various examples, the alert engine 121 identifies the task based at least in part on an analysis of the user context data 133. For example, the user context data 133 can include information about tasks or actions items that are currently being performed by a user interacting with the client device 106 and/or are in need of being performed by a user. In an enterprise setting, for example, users may be interacting with client devices 106 to complete work related tasks including replying to high priority emails, resolving high priority tickets, attending meetings, and/or other types of tasks. In various examples, the alert engine 121 can analyze the user context data 133 including messaging data, calendar data, third-party integration data, and/or other data to identify a task associated with the user of the client device 106. In some examples, the alert engine 121 executes the connectivity prediction model 126 which can be trained to identify tasks associated with the user based at least in part on the user context data 133.

At step 312, the alert engine 121 determines if the task is time-sensitive. For example, if the task will be affected by the predicted connectivity issue, the alert engine 121 can determine that the task is time-sensitive. In some examples, a task may be determined to be time-sensitive if the task will be affected by the predicted connectivity issue and the user has defined the type of task as being a high priority task. For example, assume that the task corresponds to replying to an email sent by a manager of the user and the user has defined that responding to emails sent by the manager are to be considered high priority items (e.g., as reflected in the alert configuration data 166), the alert engine 121 can determine that the task is time-sensitive. In some examples, the alert engine 121 executes the connectivity prediction model 126 which can be trained to identify tasks associated with the user based at least in part on the user context data 133. In various examples, the connectivity prediction model 126 outputs only tasks that are to be considered time-sensitive tasks that will be affected by the predicted connectivity issue and are to be considered high priority and therefore, time-sensitive. If the task is determined to be time-sensitive, the alert engine 121 proceeds to step 315. Otherwise, this portion of the process proceeds to completion.

At step 312, the alert engine 121 generates an alert notification 145. In various examples, the alert notification 145 identifies the time-sensitive task and the future connectivity issue. In some examples, the alert notification 145 corresponds to a user interface 151, a user interface component, or user interface code for generating the user interface 151 or user interface component. In various examples, the alert notification 145 can comprise an email, an SMS message, a push notification, and/or other type of notification.

At step 315, the alert engine 121 causes the alert notification 145 to be rendered on the client device 106. In some examples, the alert engine 121 transmits the alert notification 145 to the client device 106. In various examples, the alert notification 145 can be rendered as a user interface component (e.g., pop-up box) presented on a user interface 151 associated with a client application 127 and/or management component 130 executing on the client device 106. In other examples, the alert notification 145 can comprise comprises a short messaging service (SMS) message. In other examples, the alert notification 145 comprises an email, a short messaging service (SMS) message, a push notification, a user interface component presented on a user interface 151 that a user may be interacting with at the notification time and/or any other type of notification. In some examples, the alert notification 145 can include a link that, upon selection, redirects the user to a user interface 151 for viewing the contents of the notification 145. Thereafter, this portion of the process proceeds to completion.

Figure 4:
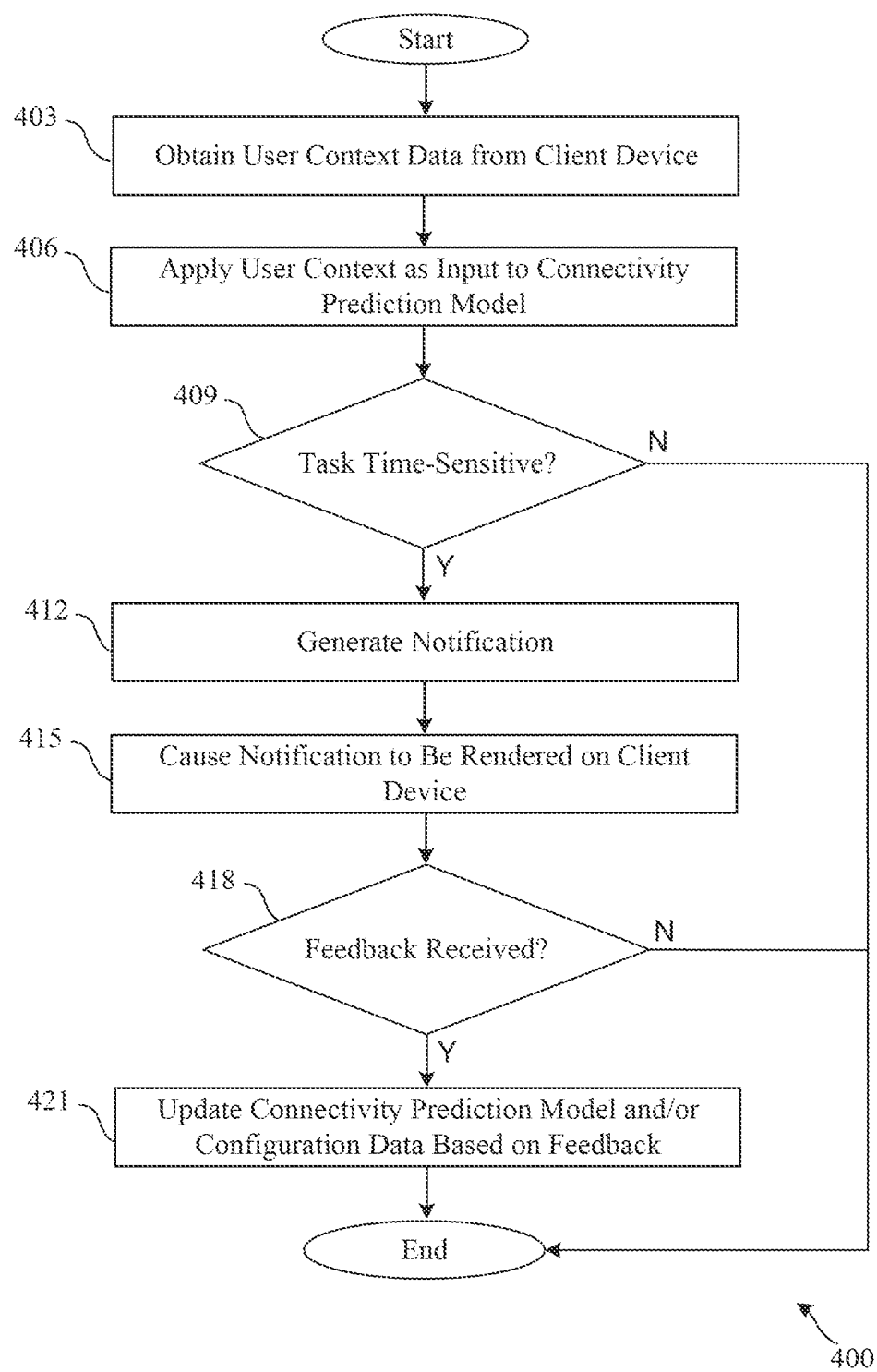

Moving on to FIG. 4, shown is a flowchart 400 that provides one example of the operation of a portion of the alert engine 121. The flowchart of FIG. 4 can be viewed as depicting an example of elements of a method implemented by the alert engine 121 executing in the computing environment 103 according to one or more examples. The separation or segmentation of functionality as discussed herein is presented for illustrative purposes only.

Beginning at step 403, the alert engine 121 receives user context data 133 from a client device 106. The user context data 133 can include, for example, calendar data, messaging data, third-party integration data, and/or other information that can be used to better understand the user and the behavior of the interacting with the client device 106. In various examples, the user context data 133 can be collected by the client application 127 (or management component 130) executed on the client device 106 an provided to the alert engine 121. In some examples, the user context data 133 is received intermittently, periodically, at a predefined schedule, and/or other period of time.

At step 406, the alert engine 121 applies the user context data 133 as an input to a trained connectivity prediction model 136. For example, the connectivity prediction model 136 can be trained using historical connectivity data 124 associated with one or more client devices 106 associated with one or more users. In this example, the connectivity prediction model 126 can apply learned patterns of connectivity issues along with the user context data 133 to detect future connectivity issues.

At step 409, the alert engine 121 determines if there is a time-sensitive task based at least in part on the output of the connectivity prediction model 136. In some examples, the connectivity prediction model 136 outputs tasks that are to be considered time-sensitive tasks that will be affected by the predicted connectivity issue and are to be considered high priority and therefore, time-sensitive. Therefore, if the output of the connectivity prediction model 136 includes a task, the alert engine 121 can determine that the task is time-sensitive. If a task is time-sensitive, the alert engine 121 proceeds to step 412. Otherwise, this portion of the process proceeds to completion.

At step 412, the alert engine 121 generates an alert notification 145. In various examples, the alert notification 145 identifies the time-sensitive task and the future connectivity issue. In some examples, the alert notification 145 corresponds to a user interface 151, a user interface component, or user interface code for generating the user interface 151 or user interface component. In various examples, the alert notification 145 can comprise an email, an SMS message, a push notification, and/or other type of notification.

At step 415, the alert engine 121 causes the alert notification 145 to be rendered on the client device 106. In some examples, the alert engine 121 transmits the alert notification 145 to the client device 106. In various examples, the alert notification 145 can be rendered as a user interface component (e.g., pop-up box) presented on a user interface 151 associated with a client application 127 and/or management component 130 executing on the client device 106. In other examples, the alert notification 145 can comprise comprises a short messaging service (SMS) message. In other examples, the alert notification 145 comprises an email, a short messaging service (SMS) message, a push notification, a user interface component presented on a user interface 151 that a user may be interacting with at the notification time and/or any other type of notification. In some examples, the alert notification 145 can include a link that, upon selection, redirects the user to a user interface 151 for viewing the contents of the notification 145.

At step 418, the alert engine 121 determines if feedback data 154 has been received in response to the alert notification 145 being rendered on the client device 106. For example, a user can be redirected to a feedback interface 206 in response to interacting with an alert notification 145. The feedback interface 206 can allow the user to modify and/or otherwise generate feedback data 154 which can be used to modify alert configuration data 166. The alert configuration data 166 corresponds to configuration data that defines how and when a user is to be notified of a potential connectivity issues and/or time-sensitive task. For example, a user can define user preferences associated with given tasks and/or connectivity time periods. In some examples, the user can modify the priority levels associated with a given task which the alert engine 121 can use to help tune future predications of time-sensitive tasks. If feedback data 154 is received, the alert engine 121 proceeds to step 412. Otherwise, this portion of the process proceeds to completion.

At step 421, the alert engine 121 updates the connectivity prediction model 136 based at least in part on the feedback data 154 to align with the user preferences and/or to accurately predict connectivity issues and time-sensitive tasks. Thereafter, this portion of the process proceeds to completion.

Figure 5:
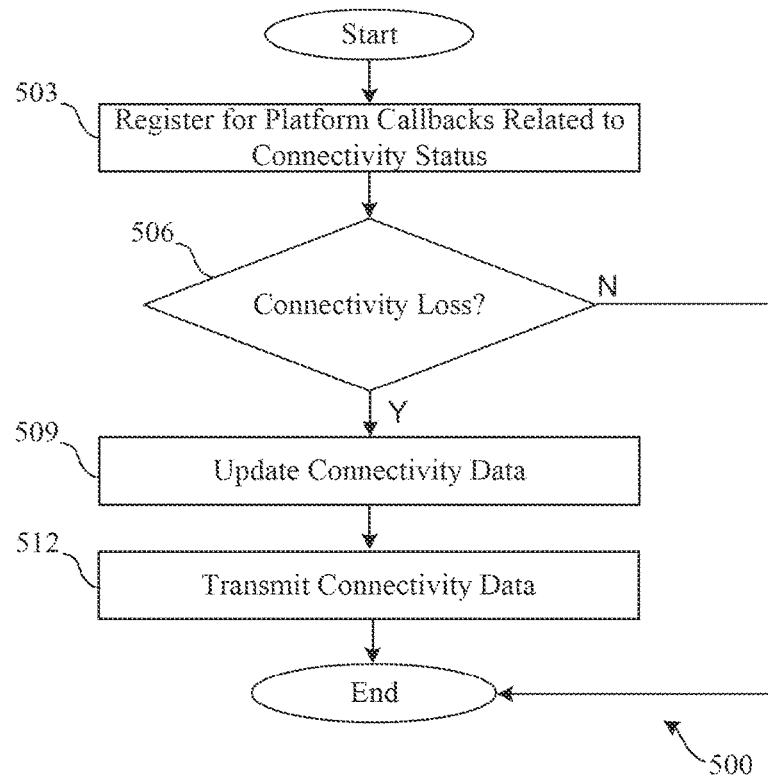

Moving on to FIG. 5, shown is a flowchart 500 that provides one example of the operation of a portion of the client application 127. The flowchart of FIG. 5 can be viewed as depicting an example of elements of a method implemented by client application 127 executing in the client device 106 according to one or more examples. The separation or segmentation of functionality as discussed herein is presented for illustrative purposes only.

Beginning at step 503, the client application 127 registers for platform callbacks related to the connectivity status of the client device 106. For example, the client application 127 can interact with the operation system of the client device 106 to obtain information regarding connectivity of the network signals. In this example, every time a modem of the client device 106 disconnects from a network connectivity (e.g., Wi-Fi, cellular, Bluetooth, etc.), the platform (e.g., operating system) receives a notification from the modem. When the client application 127 registers for platform callbacks, the platform will notify the client application 127 of the disconnect.

At step 506, the client application 127 determines if there is a disconnect in the network connectivity. If the client application 127 receives a callback from the platform indicating a disconnect, the client application 127 can determine that there is a disconnect in the network connectivity. As such, the client application 127 proceeds to step 509. Otherwise, if a notification has not been received from the platform, this portion of the process proceeds to completion.

At step 509, the client application 127 generates or updates the connectivity data 124. The connectivity data 124 can comprise information associated with a loss of connectivity, a date/time of connectivity loss, a location of connectivity loss, a duration of connectivity loss, user actions prior to the connectivity loss, user appointments associated with the connectivity loss, and/or other data. The connectivity data 124 can be collected from various sources associated with a client device to predict connectivity issues and/or better understand a context associated with the connectivity issue. In various examples, the client application 127 can generate a log entry in a connectivity data log that indicates the connectivity issue, the time of the connectivity issue, the location of the connectivity issue, and/or other issue. In addition, the client application 127 can determine (upon receiving a notification from the platform) that the connectivity issue has been resolved and further determine a duration of the connectivity issue. Therefore, the log entry can further include a duration of the connectivity issue.

At step 512, the client application 127 transmits the connectivity data 124 to the management service 115, the alert engine 121, and/or other service in the computing environment 103. In some examples, the connectivity data 124 is transferred periodically and/or at a predefined schedule. In other examples, the connectivity data 124 is transferred upon detecting a connectivity issue. In some examples, the client application 127 can transmit a full or partial portion of the connectivity data 124. For example, the client application 127 can transmit connectivity data 124 associated with a given time period (e.g., prior 24 hours, etc.). Thereafter, this portion of the process proceeds to completion.

Figure 6:
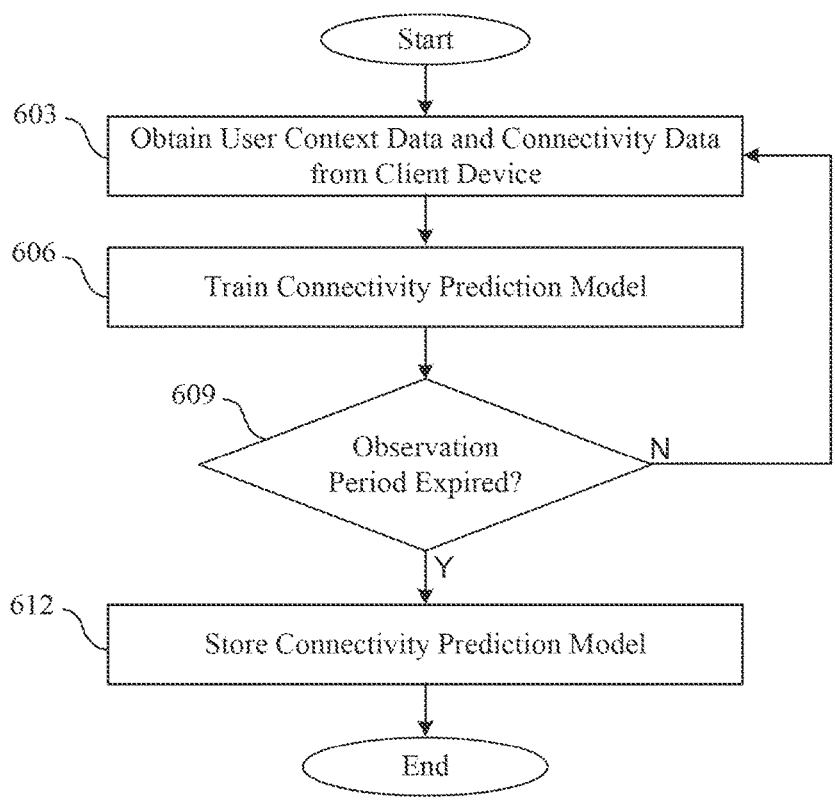

Moving on to FIG. 6, shown is a flowchart 600 that provides one example of the operation of a portion of the alert engine 121. The flowchart of FIG. 6 can be viewed as depicting an example of elements of a method implemented by the alert engine 121 executing in the computing environment 103 according to one or more examples. The separation or segmentation of functionality as discussed herein is presented for illustrative purposes only.

Beginning at step 603, the alert engine 121 obtains user context data 133 and connectivity data 124 associated with a client device 106. The user context data 133 can include, for example, calendar data, messaging data, third-party integration data, and/or other information that can be used to better understand the user and the behavior of the interacting with the client device 106. The connectivity data 124 can comprise information associated with a loss of connectivity, a date/time of connectivity loss, a location of connectivity loss, a duration of connectivity loss, user actions prior to the connectivity loss, user appointments associated with the connectivity loss, and/or other data. In various examples, the user context data 133 and the connectivity data 124 can be collected by the client application 127 (or management component 130) executed on the client device 106 an provided to the alert engine 121. In some examples, the user context data 133 and/or connectivity data 124 can be received intermittently, periodically, at a predefined schedule, and/or other period of time.

At step 606, the alert engine 121 trains the connectivity prediction model 136 based at least in part on the user context data 133 and the connectivity data 124. The connectivity prediction model 136 is specific to each user and can include, for example, a reinforcement learning algorithm, a logistic regression classifier, a random forest classifier, a decision tree classifier, a XGBoost classifier, a multi-layer perceptron classifier, a recurrent neural network, a feed-forward neural network, a label-specific attention network, and/or any other type of trained model as can be appreciated. In various implementations, the recommendation model 136 can be trained to predict a future connectivity issues and identify a time-sensitive task based at least in part on an analysis of user context data 133 and connectivity data 124. For example, the connectivity prediction model 136 can be trained using historical connectivity data 124 associated with one or more client devices 106 associated with one or more users. In this example, the connectivity prediction model 126 can apply learned patterns of connectivity issues along with the user context data 133 to detect future connectivity issues. In some examples, the alert engine 121 can execute a connectivity prediction model 136 which can be trained to predict connectivity issues based at least in part on the user context data 133. In addition, the connectivity prediction model 126 can be trained to learn patterns of connectivity issues along with the user context data 133 to detect future connectivity issues.

At step 609, the alert engine 121 determines if the observation period has ended for training the connectivity prediction model 126. For example, if the connectivity prediction model 126 is performing at a predefined level of certainty, the alert engine 121 can determine that the observation period has ended. In other examples, the observation period can be configured to last over a predefined period of time. In this example, the predefined period of time can be based on days, weeks, months, and/or other period of time. After the predefined period of time has elapsed, the alert engine 121 can determine that the observation period has ended.

At step 612, the alert engine 121 stores the connectivity prediction model 126 in association with the user account. Thereafter, this portion of the process proceeds to completion.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 127, the management component 130, and potentially other applications. Also stored in the memory can be a data store 122 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 148 upon which a user interface 151 generated by the management console 118, the client application 127, the management component 130, or another application can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the management service 115, management console 118, the alert engine 121, the client application 127, the management component 130, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts of FIGS. 3-6 show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowchart of FIGS. 3-6 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
a computing device comprising a processor and a memory; and
machine-readable instructions stored in the memory which, when executed by the processor, cause the computing device to at least:
obtain user context data from a client device associated with a user;
predict a future geolocation-derived connectivity issue associated with the client device based at least in part on the user context data and connectivity data, the future geolocation-derived connectivity issue comprising a connectivity issue that is likely to be experienced by the client device due to a predicted future geolocation of the client device at a certain future time;
identify a time-sensitive user task based at least in part on an analysis of the user context data and the future geolocation-derived connectivity issue, the time-sensitive user task comprising a user task to be performed by the user within a predefined period of time and affected by the future geolocation-derived connectivity issue;
generate a notification indicating the future geolocation-derived connectivity issue and the time-sensitive user task; and
transmit the notification to the client device.

2. The system of claim 1, wherein the user context data comprises calendar data, messaging data, and third-party integration data.

3. The system of claim 1, wherein, when executed, the machine-readable instructions further cause the computing device to at least:
identify a user task associated with the user based at least in part on the analysis of the user context data; and
determine that a completion of the user task requires a network connection, the user task being identified as the time-sensitive user task in response to determining that the completion of the user task can occur during the future geolocation-derived connectivity issue.

4. The system of claim 1, further comprising a connectivity prediction model executable by the processor, the future geolocation-derived connectivity issue being predicted by the connectivity prediction model and the time-sensitive user task being identified by the connectivity prediction model.

5. The system of claim 4, wherein the machine-readable instructions, when executed by the processor, further cause the computing device to at least:
receive feedback from the client device in response to the notification; and
update the connectivity prediction model based at least in part on the feedback.

6. The system of claim 1, wherein the machine-readable instructions, when executed by the processor, further cause the computing device to at least obtain configuration data from the client device, the configuration data defining user preferences for time-sensitive user task alerts, the time-sensitive user task further being identified based at least in part on the configuration data.

7. The system of claim 1, wherein the client device is one of a plurality of client devices managed by a management service, the connectivity data comprises aggregate connectivity data associated with the plurality of client devices.

8. A non-transitory computer-readable medium embodying executable instructions which, when executed by a computing device, cause the computing device to at least:
obtain user context data from a client device associated with a user;
predict a future geolocation-derived connectivity issue associated with the client device based at least in part on the user context data and connectivity data, the future geolocation-derived connectivity issue being a connectivity issue that is likely to be experienced by the client device due to a predicted future geolocation of the client device at a certain future time;
identify a time-sensitive user task based at least in part on an analysis of the user context data and the future geolocation-derived connectivity issue, the time-sensitive user task being a user task to be performed by the user within a predefined period of time and affected by the future geolocation-derived connectivity issue;
generate a notification indicating the future geolocation-derived connectivity issue and the time-sensitive user task; and
transmit the notification to the client device.

9. The non-transitory computer-readable medium of claim 8, wherein the user context data comprises calendar data, messaging data, and third-party integration data.

10. The non-transitory computer-readable medium of claim 8, wherein the executable instructions, when executed by the computing device, further cause the computing device to at least:
identify a user task associated with the user based at least in part on the analysis of the user context data; and
determine that a completion of the user task requires a network connection, the task being identified as the time-sensitive user task in response to determining that the completion of the user task can occur during the future geolocation-derived connectivity issue.

11. The non-transitory computer-readable medium of claim 8, wherein the future geolocation-derived connectivity issue is predicted by a connectivity prediction model and the time-sensitive user task is identified by the connectivity prediction model.

12. The non-transitory computer-readable medium of claim 11, wherein the executable instructions, when executed by the computing device, further cause the computing device to at least:

receive feedback from the client device in response to the notification; and update the connectivity prediction model based at least in part on the feedback.

13. The non-transitory computer-readable medium of claim 8, wherein the executable instructions, when executed by the computing device, further cause the computing device to at least obtain configuration data from the client device, the configuration data defining user preferences for time-sensitive user task alerts, the time-sensitive user task further being identified based at least in part on the configuration data.

14. The non-transitory computer-readable medium of claim 8, wherein the client device is one of a plurality of client devices managed by a management service, the connectivity data comprises aggregate connectivity data associated with the plurality of client devices.

15. A computer-implemented method, comprising:
obtaining, by at least one computing device, user context data from a client device associated with a user;
predicting, by the at least one computing device, a future geolocation-derived connectivity issue associated with the client device based at least in part on the user context data and connectivity data, the future geolocation-derived connectivity issue being a connectivity issue that is likely to be experienced by the client device due to a predicted future geolocation of the client device at a certain future time;
identifying, by the at least one computing device, a time-sensitive user task based at least in part on an analysis of the user context data and the future geolocation-derived connectivity issue, the time-sensitive user task being a user task to be performed by the user within a predefined period of time and affected by the future geolocation-derived connectivity issue;
generating, by the at least one computing device, a notification indicating the future geolocation-derived connectivity issue and the time-sensitive user task; and
transmitting, by the at least one computing device, the notification to the client device.

16. The computer-implemented method of claim 15, wherein the user context data comprises calendar data, messaging data, and third-party integration data.

17. The computer-implemented method of claim 15, further comprising;
identifying a user task associated with the user based at least in part on the analysis of the user context data; and
determining that a completion of the user task requires a network connection, the task being identified as the time-sensitive user task in response to determining that the completion of the user task can occur during the future geolocation-derived connectivity issue.

18. The computer-implemented method of claim 15, wherein the future geolocation-derived connectivity issue is predicted by a connectivity prediction model and the time-sensitive user task is identified by the connectivity prediction model.

19. The computer-implemented method of claim 18, further comprising:
receiving feedback from the client device in response to the notification; and
updating the connectivity prediction model based at least in part on the feedback.

20. The computer-implemented method of claim 15, further comprising obtaining configuration data from the client device, the configuration data defining user preferences for time-sensitive user task alerts, the time-sensitive user task further being identified based at least in part on the configuration data.

* * * * *